March 7, 1939. J. M. CHRISTMAN 2,149,909
GEAR LAPPING MACHINE
Filed Sept. 23, 1935
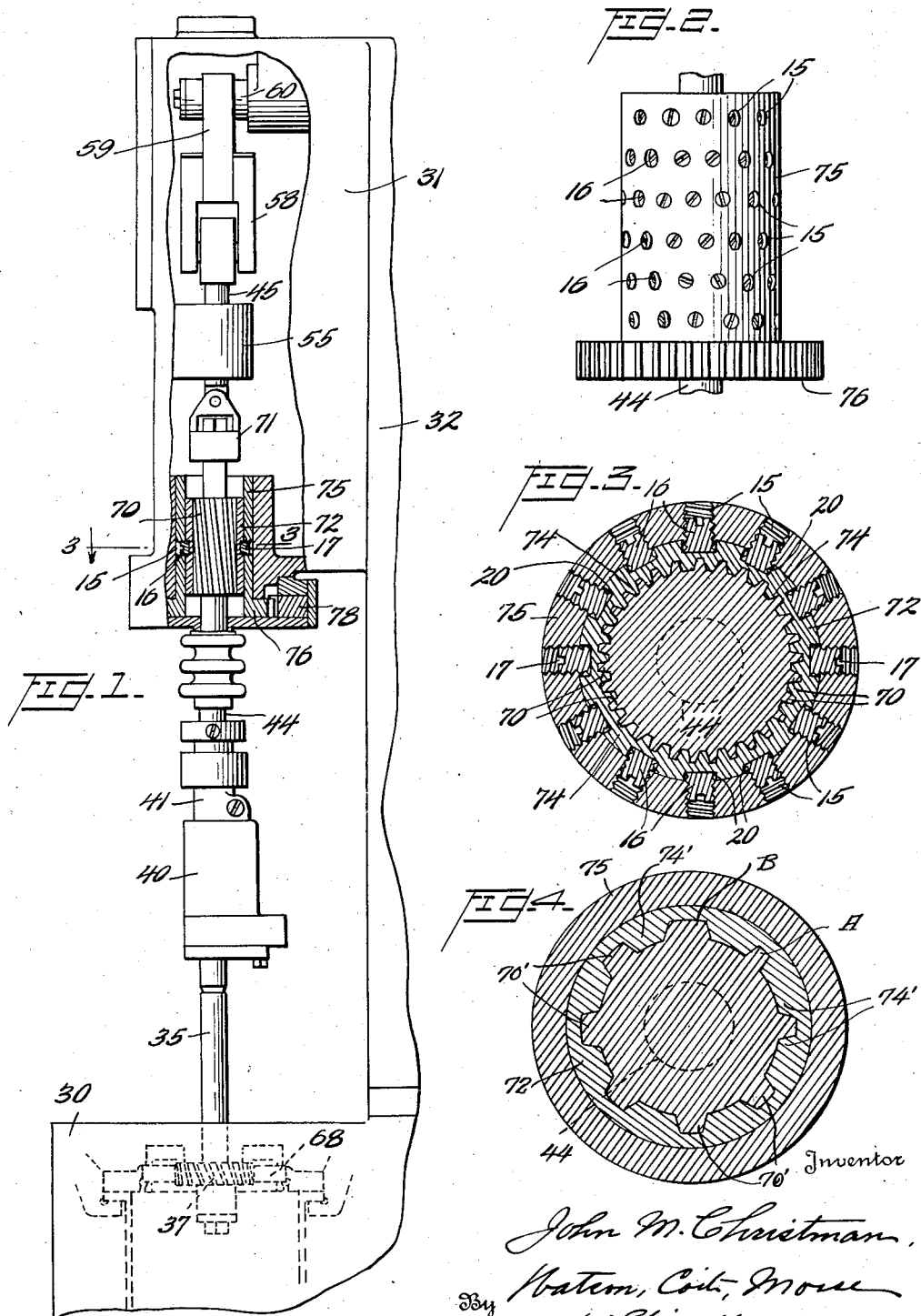

Patented Mar. 7, 1939

2,149,909

UNITED STATES PATENT OFFICE 2,149,909

GEAR LAPPING MACHINE

John M. Christman, Detroit, Mich., assignor to Packard Motor Car Company, Detroit, Mich., a corporation of Michigan Application September 23, 1935, Serial No. 41,802

15 Claims. (Cl. 51—157)

This invention relates primarily to apparatus for improving radially toothed machine elements such as gears and the like, for instance by the lapping or grinding of gear teeth after the formation of the teeth by the usual milling or cutting operations, and is a continuation in part of my prior filed application Serial No. 17,728, filed April 22, 1935.

My prior application discloses a lapping machine which, in the preferred embodiment thereof, employs a fixed lap and a reciprocating support for the gear to be lapped, circumferential pressure being applied between the lap and the gear during relative reciprocation thereof by the application of torque to the gear support. The cooperating teeth of the gear and lap are maintained in their proper relation during the process by means of a guide which is associated with the gear support and which is illustrated as a tongue and groove device. If the gear being lapped is provided with straight teeth, the cooperating tongue and groove members of the guide are similarly straight and are arranged in parallel relation to the path of reciprocation of the gear; if the gear being lapped is provided with helical teeth, the tongue and groove members of the guide are formed to afford a similar lead.

It has been found that this guide is subject to wear and requires frequent replacement necessitating loss of time in the operation of the machine and involving considerable expense, very accurate machining of the cooperating members of the guide being necessary in order that the gear teeth may properly cooperate with the lap teeth during relative reciprocation. It is therefore proposed as an essential feature of the present invention to provide a guide of this character which may be readily adjusted to eliminate clearance between the cooperating members thereof and to avoid play and backlash in the lapping machine resulting from wear of the guide.

More specifically, it is an object of the invention to provide a guide for the reciprocating support of a lapping machine which comprises male and female members having a cooperating tongue and groove relationship, and means whereby the ratio of the width of the tongues to the width of the cooperating grooves may be increased to eliminate clearance therebetween. In one embodiment of the invention the tongues are directly expanded to effect the desired result; in another form of the invention the width of adjacent and successive tongues and of the cooperating grooves is progressively increased in one circumferential direction, whereby on the occurrence of wear the members of the guide may be indexed for the purpose of eliminating clearance.

While the present invention is concerned primarily with gear lapping machines of the character described which necessitate the employment of a guide comprising relatively movable members which must be fitted together with extreme accuracy, it will be appreciated that the inventive concept is applicable to machine elements of a generally similar nature for use in other combinations. Thus the guide disclosed in this application may be considered as constituting a splined or a screw and nut connection between any two relatively reciprocable members, it being conceivably highly desirable, for instance, to eliminate clearance between the cooperating toothed members of a screw and nut device by expansion of the teeth of either member, this expansion being either effected directly by deformation of the teeth or by the indexing of a properly designed structure to alter the cooperative relationship of the teeth and the tooth receiving recesses.

Further objects and features of the invention will be apparent from the following description taken in connection with the accompanying drawing, in which Figure 1 is a side elevation, partly in section, of a gear lapping machine illustrating the application of one form of the present invention thereto;

Figure 2 is an elevation of one member of the guide for the reciprocating gear support shown in Figure 1;

Figure 3 is a section on the line 3—3 of Figure 2; and

Figure 4 is a sectional view of the cooperating members of a guide constructed in accordance with another embodiment of the invention.

In order to facilitate an understanding of the invention, reference is made to the two embodiments thereof shown in the accompanying drawing and detailed descriptive language is employed. It will nevertheless be understood that no limitation of the invention is thereby intended, and that various changes and alterations are contemplated such as would ordinarily occur to one skilled in the art to which the invention relates.

While the guide which forms the principal feature of the present invention is applicable to gear lapping machines of other types and, in some degree, to machines of distinctly different nature, the drawing illustrates a machine of the character disclosed in my prior application above identified in which means is provided for imparting relative reciprocating movement to a gear and a lap and for applying torque thereto during such reciprocation. Thus the machine may comprise a frame including a base 30 and a head portion 31 overlying the base, the head portion being supported by a standard 32 rising from the base. A shaft 35, carrying at its lower end a gear 37 to be lapped, is clamped or otherwise secured in position in a bracket 40. The details of the bracket 40 form no part of the present invention, it being sufficient to state that the arrangement is such as to facilitate the application to and the removal from the bracket of the shaft 35 and the associated gear 37. The bracket 40 is provided with an upwardly directed boss 41 which may be keyed or otherwise secured against rotation on a shaft 44. The shaft 44 may be connected by means of a conventional type of rotating coupling, indicated at 71, to a shaft 45, whereby the shaft 44 is permitted to rotate freely. The shaft 45 is supported in a conventional bearing guide 55 and is operatively connected by means of a pitman 58 to an eccentric 59 formed on or secured to a shaft 60, the latter being carried by the head portion 31 of the frame and having secured thereto at its outer end a pulley or other conventional driving mechanism, not shown.

It will be appreciated that by means of the mechanism thus far described, rotation of the shaft will effect reciprocation of the shafts 45 and 44, the bracket 40, the shaft 35, and the gear 37 to be lapped, gear 37 meshing during the operation with a stationary lap 68 which may be supported rigidly on the base 30 of the frame in any desired manner.

With a machine of this character it is possible to effect very rapid reciprocation of the gear in the lap and it is important that the shafts 44 and 45 and the gear 37 be accurately guided so that the gear teeth may follow the teeth of the lap and so that the pressure between the cooperating teeth may be accurately controlled. With this end in view, it is proposed that the means which serves to guide the shaft 44 and associated elements during reciprocation thereof may also be employed for the purpose of applying pressure between the cooperating teeth of the gear and lap. Guide means of this character is shown in the drawing as associated with the upper end of the shaft 44 and is illustrated as formed to effect rotation of the shaft 44 during reciprocation thereof for the lapping of a gear having helical teeth, it being understood that the construction may be suitably modified to prevent rotation of the shaft 44 during reciprocation if the machine is to be used for the lapping of a gear with straight teeth.

Thus the guide means is illustrated as comprising one or more cooperating tongue and groove elements, such elements constituting in effect a cam device in the event the teeth of the gear and lap are not straight. The shaft 44 is formed with an enlarged portion having generally axially directed teeth 70 thereon, these teeth cooperating with corresponding internal teeth 74 on a sleeve 75 which surrounds the shaft, an inner sleeve 72 of bearing metal having the teeth 74 formed thereon being preferably cast within the sleeve 75 for this purpose, the bearing metal being suitably locked in position against displacement with respect to the sleeve 75. Since the invention is illustrated as applied to the lapping of a helically toothed gear, the cooperating teeth 70 and 74 are constructed to afford a corresponding lead, it being understood that in the event a gear having straight teeth is being lapped, the teeth 70 and 74 will be correspondingly straight and generally parallel to the axis of reciprocation of the shaft 44 and associated members.

The sleeve 75 is supported for rotation in the head portion 31 of the frame and is provided at its lower end with an annular flange 76 having a toothed periphery which is engaged by a rack 78, the latter being supported for reciprocation in a substantially horizontal plane.

Assuming that the sleeve 75 is held against rotation by retention of the rack 78 against displacement, it will be appreciated that the shaft 44 will be rotated during vertical reciprocation thereof, by reason of the cooperation of the teeth 70 and 74, and the teeth of the gear 37 will thereby be caused to accurately follow the cooperating teeth of the lap 68. When, however, the sleeve 75 is rotated by reciprocation of the rack 78, this sleeve will act through the teeth 70 to effect a slight rotation of the shaft 44 in one direction or the other. Thus the bracket 40, shaft 35, and gear 37 may be rotated to an extent sufficient to apply pressure between one side of the cooperating gear teeth on the lap 68 and gear 37, the pressure so applied preferably being sufficient to ensure reasonably rapid abrasive action between the cooperating teeth while insufficient to cause the extrusion from between these cooperating teeth of the abrasive material usually employed in machines of this character. In my prior application an arrangement is disclosed whereby automatic control of the rack 78 and of the pressure applied between the teeth of the gear and lap is accurately effected, but it is obvious that the rack 78 may be reciprocated manually if desired.

Referring now more particularly to the form of the guide means illustrated in Figures 2 and 3 of the drawing, it will be observed that the sleeve 75 is shown as provided with a plurality of apertures 15 extending therethrough, each of these apertures being threaded for the reception of a threaded element 16 which may be provided with a slot 17 or polygonal opening in the outer end thereof for engagement by a screw driver or other tool. The apertures 15 are preferably arranged in a series of circumferentially extending rows, the several rows being spaced axially of the sleeve. If desired the apertures in each row may be staggered slightly with respect to those in adjacent rows and may be so arranged as to form a series of columns, the apertures in a given column extending both axially and circumferentially so as to conform generally to the helices of the teeth 74 formed in the bearing metal sleeve 72 associated with the sleeve 75. The apertures may further be so arranged that such a column of apertures extends along and overlies each of the helical teeth or ribs 74, although this is not essential. Each of the elements 16 preferably extends within a recess 20 formed in the peripheral portion of the bearing metal sleeve 72 and aligned with the associated aperture 15.

The manner in which the guide means is adjusted to eliminate clearance will now be apparent. In order to take up initial play resulting from manufacturing tolerances and in order to eliminate clearance produced by wear of the teeth 74, the elements 16 are threaded down into the apertures 15 so as to exert pressure at the base of each recess 20, whereby the entire bearing metal sleeve 72 may be deformed and the relatively soft metal thereof caused to flow to some extent to completely or partially fill the cooperating grooves between adjacent teeth 70 on the shaft 44. The adjustment may be rapidly effected and extreme accuracy of fit between the cooperating teeth 70 and 74 will result, with consequent improvement in the accuracy of mesh between the cooperating teeth of the gear 37 and lap 68. The same guide may therefore be employed effectively for a much longer period of time and expensive replacements avoided.

Figure 4 of the drawing illustrates a further embodiment of the guide means which is constructed so that accurate adjustment of the clearance in the cooperating tongue and groove relation thereof may be readily effected. In this construction the teeth 70' formed on the shaft 44 vary progressively in width in one circumferential direction. Thus the smallest of the teeth 70' is indicated at A, and adjacent and successive teeth, proceeding in a clockwise direction, are of gradually increasing width, the largest of the teeth 70' being indicated at B. The median lines of the teeth 70' are uniformly spaced about the periphery of the shaft; the teeth 74' are so shaped and distributed as to fit snugly into the spaces between the teeth 70'. Proper initial cooperation of the teeth 70' and 74' is readily effected by casting the bearing sleeve 72 about a formed toothed element. It will be appreciated that the progressive increase in the thickness of the teeth 70' is exaggerated in Figure 4 to facilitate an understanding of the structure; ordinarily a very considerably greater number of teeth are employed, and the progressive increase in the width of the teeth is correspondingly slight.

On the occurrence of wear, the toothed portion of the shaft 44 is withdrawn from the sleeve 75 and is indexed with respect thereto in a counter-clockwise direction, whereby each groove intermediate adjacent teeth 70' receives a tooth 74' of larger width than the tooth which it originally received, the extent of indexing being of course sufficient to ensure a fairly close fit between the cooperating teeth 70' and 74'. As the result of this indexing, one or more of the smaller teeth 70' will be rendered useless since they will engage in cooperating tooth spaces intermediate the teeth 74' of substantially larger width. However, a sufficient number of cooperating teeth will ordinarily be provided to ensure adequate bearing surface to enable the members of the guide to be indexed a number of times before replacement is necessary.

It will be appreciated that the invention in its broadest aspect contemplates the provision in relatively movable guide members having a tongue and groove connection, of means for adjusting the ratio of the width of the tongues to the width of the cooperating grooves, regardless of how this adjustment is effected. In one embodiment of the invention the means for effecting adjustment functions to directly expand the tongues; in the other form of the invention, this means includes increments in the width of adjacent and successive teeth of progressively larger magnitude, whereby indexing of the two members will accomplish the desired result.

Having thus described the invention, what is claimed as new and desired to be secured by Letters Patent is:

1. In a gear lapping machine, the combination with a toothed lap member, of a support for said member, a support for a toothed gear member to be lapped, said supports carrying said members in intermeshing relation, means for reciprocating at least one of said supports and the member carried thereby, guide means associated with a reciprocated support for constraining the latter to follow the generally axial direction of the teeth of the gear and lap members during such reciprocation, and means whereby play and lost motion developed in said guide means as the result of wear may be eliminated.

2. In a gear lapping machine, the combination with a toothed lap member, of a support for said member, a support for a toothed gear member to be lapped, said supports carrying said members in intermeshing relation, means for reciprocating at least one of said supports and the member carried thereby, and guide means associated with a reciprocated support for constraining the latter to follow the generally axial direction of the teeth of the gear and lap members during such reciprocation, said guide means including a tongue and groove device associated with the reciprocated support, said device being adjustable to take up play resulting from wear in said tongue and groove device.

3. In a gear lapping machine, the combination with a toothed lap member, of a support for said member, a support for a toothed gear member to be lapped, said supports carrying said members in intermeshing relation, means for reciprocating at least one of said supports and the member carried thereby, and guide means associated with a reciprocated support for constraining the latter to follow the generally axial direction of the teeth of the gear and lap members during such reciprocation, said guide means including a tongue and groove device associated with the reciprocated support, the tongues of said device being expansible for eliminating clearance due to wear.

4. In a gear lapping machine, the combination with a toothed lap member, of a support for said member, a support for a toothed gear member to be lapped, said supports carrying said members in intermeshing relation, means for reciprocating at least one of said supports and the member carried thereby, guide means associated with a reciprocated support for constraining the latter to follow the generally axial direction of the teeth of the gear and lap members during such reciprocation, said guide means including a tongue and groove device associated with the reciprocated support, and means whereby the ratio of the width of the tongues to the width of the cooperating grooves of the device may be increased to eliminate clearance therebetween.

5. In a gear lapping machine, the combination with a toothed lap member, of a support for said member, a support for a toothed gear member to be lapped, said supports carrying said members in intermeshing relation, means for reciprocating at least one of said supports and the member carried thereby, guide means associated with a reciprocated support for constraining the latter to follow the generally axial direction of the teeth of the gear and lap members during such reciprocation, said guide means including a tongue and groove device associated with the reciprocated support, and means whereby the ratio of the width of the tongues to the width of the cooperating grooves of the device may be increased to eliminate clearance therebetween, said last named means including elements associated with said device and adjustable to effect expansion of said tongues.

6. In a gear lapping machine, the combination with a toothed lap member, of a support for said member, a support for a toothed gear member to be lapped, said supports carrying said members in intermeshing relation, means for reciprocating at least one of said supports and the member carried thereby, guide means associated with a reciprocated support for constraining the latter to follow the generally axial direction of the teeth of the gear and lap members during such reciprocation, said guide means including a tongue and groove device associated with the reciprocated support, and means whereby the ratio of the width of the tongues to the width of the cooperating grooves of the device may be increased to eliminate clearance therebetween, said last named means including increments of progressively larger magnitude in the width of adjacent and successive teeth, whereby the tongues may be indexed with respect to said grooves to obtain an accurate fit therebetween.

7. Guide means for controlling the relative rotative positions of two relatively reciprocable members, comprising a tongue and groove connection between said members, and means whereby the ratio of the width of the tongues to the width of the cooperating grooves of said connection may be increased to eliminate clearance therebetween.

8. Guide means for controlling the relative rotative positions of two relatively reciprocable members, comprising a tongue and groove connection between said members, and means whereby the ratio of the width of the tongues to the width of the cooperating grooves of said connection may be increased to eliminate clearance therebetween, said means including a device for effecting direct expansion of said tongues.

9. Guide means for controlling the relative rotative positions of two relatively reciprocable members, comprising a tongue and groove connection between said members, and means whereby the ratio of the width of the tongues to the width of the cooperating grooves of said connection may be increased to eliminate clearance therebetween, said means including increments of progressively larger magnitude in the width of adjacent and successive teeth, whereby the tongues may be indexed with respect to said grooves to obtain an accurate fit therebetween.

10. Guide means for relatively reciprocating members comprising male and female elements, said female element including a sleeve having a toothed annulus of deformable metal secured therein, said male element being grooved for cooperation with said annulus, and means associated with said sleeve for deforming said annulus to press the teeth thereof into intimate engagement with the grooves in said male element.

11. Guide means for relatively reciprocating members comprising male and female elements, said female element including a sleeve having a toothed annulus of deformable metal secured therein, said male element being grooved for cooperation with said annulus, and means associated with said sleeve for deforming said annulus to press the teeth thereof into intimate engagement with the grooves in said male element, said last named means including a plurality of separate plugs threaded into said sleeve and engaging said annulus.

12. An expansible nut for use in screw and nut gearing comprising a sleeve having a plurality of threaded apertures therein, a toothed annulus of relatively soft metal forming an inner lining for said sleeve, and threaded elements in said apertures engaging said annulus, whereby the annulus may be deformed and the teeth enlarged.

13. Guide means for relatively reciprocating elements comprising male and female members, said members being provided with cooperating, circularly arranged, ribs and grooves, and means whereby the ratio of the width of the ribs to the width of the grooves may be increased to eliminate clearance, said means being accessible for adjustment of such ratio during cooperative engagement of said members.

14. Guide means for relatively reciprocating elements comprising male and female members, said members being provided with cooperating ribs and grooves, and means whereby the ratio of the width of the ribs to the width of the grooves may be increased to eliminate clearance, said means including devices for effecting deformation and direct expansion of said ribs.

15. Guide means for relatively reciprocating elements comprising male and female members, said members being provided with cooperating ribs and grooves, and means whereby the ratio of the width of the ribs to the width of the grooves may be increased to eliminate clearance, said means including increments in the width of adjacent and successive teeth of progressively larger magnitude, whereby said members may be relatively indexed to effect an accurate fit between said ribs and grooves.

JOHN M. CHRISTMAN.